US008291052B2

(12) United States Patent
Boldyrev et al.

(10) Patent No.: US 8,291,052 B2
(45) Date of Patent: Oct. 16, 2012

(54) METHOD, APPARATUS, AND COMPUTER PROGRAM PRODUCT FOR DETERMINING A PATH UPDATE VIA DISTRIBUTED INFORMATION MANAGEMENT

(75) Inventors: Sergey Boldyrev, Helsinki (FI); Ronald Brown, Helsinki (FI); Arto Palin, Viiala (FI); Juha-Matti Tuupola, Tampere (FI); Antti Tuomas Lappeteläinen, Espoo (FI)

(73) Assignee: Nokia Corporation, Espoo (FI)

( * ) Notice: Subject to any disclaimer, the term of this patent is extended or adjusted under 35 U.S.C. 154(b) by 516 days.

(21) Appl. No.: 12/144,726

(22) Filed: Jun. 24, 2008

(65) Prior Publication Data

US 2009/0319645 A1 Dec. 24, 2009

(51) Int. Cl.
G06F 15/177 (2006.01)
G06F 15/173 (2006.01)
(52) U.S. Cl. ........ 709/221; 709/220; 709/224; 709/226; 370/229; 370/237
(58) Field of Classification Search .................. 709/221, 709/238–242
See application file for complete search history.

(56) References Cited

U.S. PATENT DOCUMENTS

| 7,353,294 | B1  |   | 4/2008 | Nucci et al. |         |
|-----------|-----|---|--------|--------------|---------|
| 7,363,386 | B1  | * | 4/2008 | Nucci et al. | 709/241 |
| 7,756,043 | B1  | * | 7/2010 | Nucci et al. | 370/238 |
| 7,936,688 | B2  | * | 5/2011 | Klotz et al. | 370/252 |
| 7,953,011 | B1  | * | 5/2011 | Nucci et al. | 370/238 |
| 2002/0120734 | A1 | * | 8/2002 | Riosa et al. | 709/224 |
| 2003/0204382 | A1 | * | 10/2003 | Julier et al. | 702/196 |
| 2004/0053645 | A1 |   | 3/2004 | Brignone et al. | |
| 2005/0021738 | A1 | * | 1/2005 | Goeller et al. | 709/224 |
| 2005/0083848 | A1 | * | 4/2005 | Shao et al. | 370/238 |
| 2005/0144624 | A1 | * | 6/2005 | Riosa et al. | 719/318 |
| 2006/0031573 | A1 | * | 2/2006 | Feutz et al. | 709/238 |

FOREIGN PATENT DOCUMENTS

WO WO 2008/145808 12/2008
WO WO 2009/013385 1/2009

OTHER PUBLICATIONS

Gupta et al, "Optimized query planning of continuous aggregation queries in dynamic data dissemination networks," *Proceedings of the 16th international conference on World Wide Web*, May 8-12, 2007, pp. 321-330.

(Continued)

*Primary Examiner* — Haresh N Patel
*Assistant Examiner* — Linglan Edwards
(74) *Attorney, Agent, or Firm* — Alston & Bird LLP

(57) ABSTRACT

An apparatus for distributed information management may include a processor. The processor may be configured to select one or more network domain features and one or more information domain features. In this regard, the network domain features may be based on the connectivity of a network, and the information domain features may be based on meta-data associated with information stored within the network. The processor may also be configured to determine a network domain covariance based on the one or more network domain features and determine an information domain covariance based on the one or more information domain features. Further, the processor may be configured to combine the network domain covariance and the information domain covariance to determine a path update. Associated methods and computer program products may also be provided.

14 Claims, 5 Drawing Sheets

OTHER PUBLICATIONS

Olston et al., "Adaptive filters for continuous queries over distributed data streams," *Proceedings of the 2003 ACM SIGMOD international conference on Management of data*, Jun. 9-12, 2003, pp. 563-574.

Zhang et al., "Query planning for the grid: adapting to dynamic resource availability," Proceedings of the Fifth IEEE International Symposium on Cluster Computing and the Grid (CCGrid'05)—vol. 2, pp. 751-758, May 9-12, 2005.

Luis et al., "ARIADNE: A system for contructing mediators for Internet sources," *In:Proc. of ACM SIGMOD Conf. on Management of Data*, 1998. pp. 561-563.

Oliver et al., "Personal Semantic Web Through a Space Based Computing Environment," *In proceedings: Middleware for the Semantic Web, Seconds IEEE International Conference on Semantic Computing*, Aug. 4-7, 2008.

Search Report and Written Opinion for PCT/IB2009/005955 dated Oct. 6, 2009.

Julier et al., "A Non-divergent Estimation Algorithm in the Presence of Unknown Correlations," 1997.

Franken et al., "Improved Fast Covariance Intersection for Distributed Data Fusion," *2005 7$^{th}$ International Conference on Information Fusion (FUSION)*, 2005.

Huston et al., "Diamond: A Storage Architecture for Early Discard in Interactive Search," Appears in Proceedings of USENIX Conference on File and Storage Technologies, 2004.

Trigoni et al., "Multi-query Optimization for Sensor Networks," *International Conference on Distributed-Computing in Sensor Systems (DCOSS 2005)*.

Nicholson et al., "Scalable Distributed Data Fusion," *Proceedings of the Fifth International Conference, 2002*.

Sadagopan et al., "Active Query Forwarding in Sensor Networks," *Ad Hoc Networks* 3, pp. 91-113, 2005, available at http://nile.usc.edu/~helmy/career/ACQUIRE-Journal-published.pdf.

Luo et al., "Nodes Localization Through Data Fusion in Sensor Network," *IEEE Explore*, available at http://ieexplore.ieee.org/xpl/absprintf.jsp?arnumber=1423514&page=FREE.

Deshpande et al., "Model-Driven Data Acquisition in Sensor Networks," available at: http://db.lcs.mit.edu/madden/html/vldb04.pdf. Chapter 7—Feature Section available at http://www.cs.cmu.edu/~kdeng/thesis/feature.pdf.

\* cited by examiner

METHOD, APPARATUS, AND COMPUTER PROGRAM PRODUCT FOR DETERMINING A PATH UPDATE VIA DISTRIBUTED INFORMATION MANAGEMENT

TECHNICAL FIELD

Various exemplary embodiments of the invention relate generally to sharing information via a network, and more particularly, relate to an apparatus, method, and a computer program product for sharing information via a network, where the network may have a dynamic architecture.

BACKGROUND

Traditionally, distributed information management has been based on sets of rules or policies which are predetermined by benchmarking and testing. These techniques may provide useful and accurate results when the architecture of a distributed information system is static. However, such solutions to distributed information management problems can generate non-optimal results when applied to dynamically changing environments, such as smart spaces.

Modem device usage is moving towards implementation in smart spaces. A smart space may be an environment where a number of devices may use a shared view of resources and services. In this regard, smart spaces can provide improved user experiences by allowing users to flexibly introduce new devices and access most or all of the information available in the multiple device system from any of the devices. However, a problem with information management in smart spaces can be that the location of desired information is not static. As a result, difficulties can arise in predicting the most efficient paths to access data included in the devices of the smart space.

Smart spaces often include the concept of a central repository of information, also known as a whiteboard. The whiteboard can be considered as a storage element to which every device or node in a smart space has access. Logically, only one whiteboard exists in a smart space and hence every device has access to the very same information. However, the whiteboard is merely a logical concept, and in reality the whiteboard may be comprised of a multitude of partial physical data repositories.

A challenge in providing consistent information management in a smart space is that the resources (e.g., the storage components comprising the whiteboard) are distributed over several physical devices, and as a result, the information consumers are not always in, or part of the same device as the desired information. For example, a number of content capturing devices (e.g., cameras, microphones, etc.) may provide information, while other content rendering devices (e.g., displays, speakers, etc.) may retrieve the information for presentation.

A trivial means for managing the information in these dynamic environments such that any device may readily retrieve desired information could be to copy all information to all devices. However, such a solution is typically unfeasible because some devices may have limited capabilities (e.g., storage space, computation abilities, etc.) and the cost (e.g. power consumption, impact to performance, etc.) of transferring all information over a communication channel to all devices may be excessive. Further, the dynamic architecture of the smart space also makes it difficult to guarantee that all the information will reach every device.

BRIEF SUMMARY OF SOME EXAMPLES OF THE INVENTION

A method, apparatus, and computer program product are therefore described that provide for distributed information management. In particular, exemplary embodiments of the invention may determine a path update between two entities within a dynamic network. According to various embodiments, a path update may be determined using a combination of information gathered from an information domain and information gathered from a network domain. A feature selection may be performed on the gathered data, and a covariance may be calculated based on the data from each domain. The covariances may then be combined, or fused, using, for example, a convex covariance combination. The result may be used to update a path, such that the updated path may provide an improved route between a requesting source and a target within the network.

In one exemplary embodiment, a method for distributed information management is described. The method may include selecting one or more network domain features and one or more information domain features. In this regard, the network domain features may be based on the connectivity of a network, and the information domain features may be based on meta-data associated with information stored within the network. The exemplary method may also include determining a network domain covariance based on the one or more network domain features and determining an information domain covariance based on the one or more information domain features. Further, the exemplary method may include combining the network domain covariance and the information domain covariance to determine a path update.

In another exemplary embodiment, an apparatus for distributed information management is described. The apparatus may include a processor. The processor may be configured to select one or more network domain features and one or more information domain features. In this regard, the network domain features may be based on the connectivity of a network, and the information domain features may be based on meta-data associated with information stored within the network. The processor may also be configured to determine a network domain covariance based on the one or more network domain features and determine an information domain covariance based on the one or more information domain features. Further, the processor may be configured to combine the network domain covariance and the information domain covariance to determine a path update.

In another exemplary embodiment, a computer program product for distributed information management is described. The computer program product may include at least one computer-readable storage medium having computer-readable program code portions stored therein. The computer-readable program code portions may include a first program code portion, a second program code portion, a third program code portion, and a fourth program code portion. The first program code portion may be configured to select one or more network domain features and one or more information domain features. In this regard, the network domain features may be based on the connectivity of a network, and the information domain features may be based on meta-data associated with information stored within the network. The second program code portion may be configured to determine a network domain covariance based on the one or more network domain features. The third program code portion may be configured to determine an information domain covariance based on the one or more information domain features and the fourth program code portion may be configured to combine the network domain covariance and the information domain covariance to determine a path update.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EMBODIMENTS OF THE INVENTION

Figure 1:
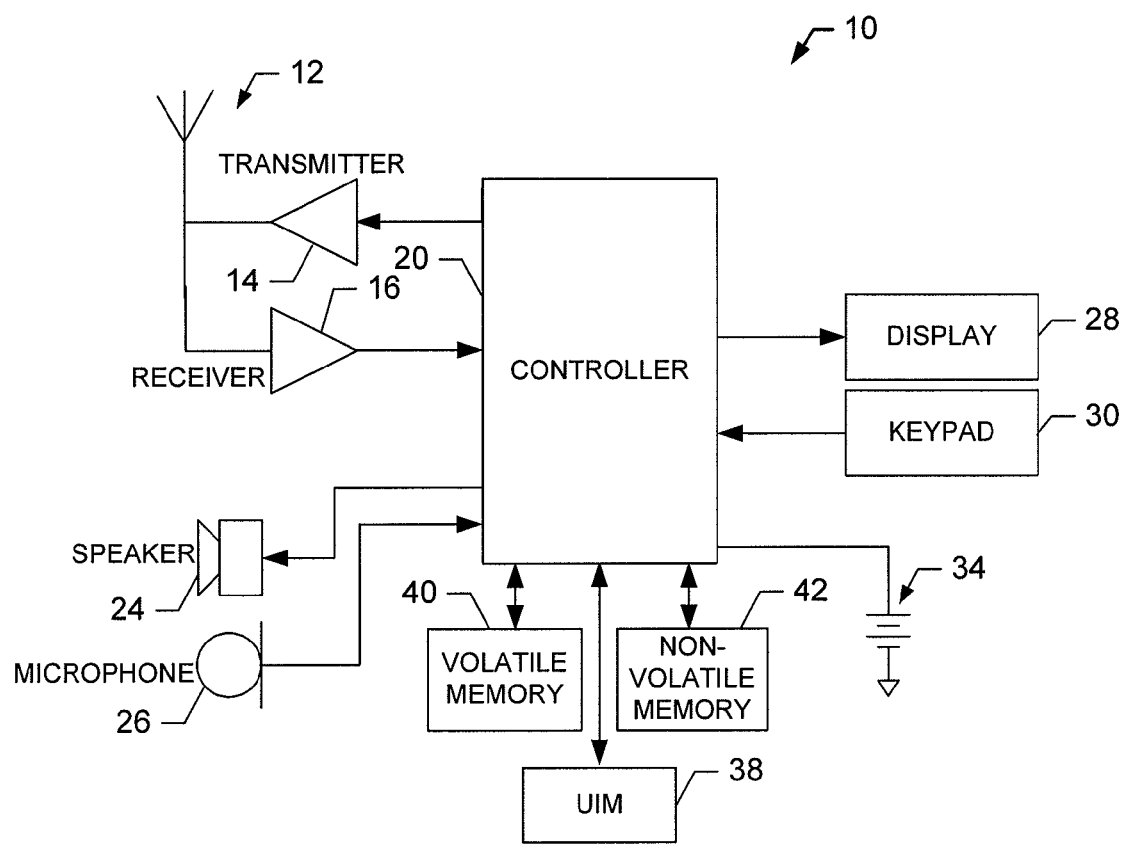
FIG. 1 is a schematic block diagram of a mobile terminal according to an exemplary embodiment of the invention.

Some embodiments of the invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from, and may be an exemplary apparatus that incorporates some embodiments of the invention. It should be understood, however, that a mobile terminal as illustrated and hereinafter described is merely illustrative of one type of mobile terminal that could benefit from some embodiments of the invention and, therefore, should not be taken to limit the scope of embodiments of the invention. While several embodiments of the mobile terminal 10 are illustrated and will be hereinafter described for purposes of example, other types of mobile terminals, such as portable digital assistants (PDAs), pagers, mobile televisions, gaming devices, mobile computers, laptop computers, cameras, video recorders, audio/video player, radio, GPS (global positioning system) devices, or any combination of the aforementioned, and other types of voice and text communications systems, can readily employ some embodiments of the invention.

In addition, while several exemplary embodiments of a method of the invention may be performed or used by a mobile terminal 10, the method may be employed by other than a mobile terminal. Moreover, an apparatus and method of exemplary embodiments of the invention will be primarily described in conjunction with mobile communications applications. It should be understood, however, that an apparatus and method of embodiments of the invention can be utilized in conjunction with a variety of other applications, both in the mobile communications industries and outside of the mobile communications industries.

The mobile terminal 10 may include an antenna 12 (or multiple antennas) in operable communication with a transmitter 14 and a receiver 16. The mobile terminal 10 may further include an apparatus, such as a controller 20 or other processing element that provides signals to and receives signals from the transmitter 14 and receiver 16, respectively. The signals may include or be representative of signaling information in accordance with the air interface standard of the applicable cellular system, and also speech, received data and/or transmitted data. In this regard, the mobile terminal 10 may be capable of operating with one or more air interface standards, communication protocols, modulation types, and/or access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9 generation (3.9G) wireless communication protocols, such as Evolved Universal Terrestrial Radio Access Network (E-UTRAN), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN), or other communication networks. Further, the mobile terminal 10 can communicate in accordance with techniques such as, for example, radio frequency (RF), infrared (IrDA) or any of a number of different wireless networking techniques, including WLAN techniques such as IEEE 802.11 (e.g., 802.11a, 802.11b, 802.11g, 802.11n, etc.), world interoperability for microwave access (WiMAX) techniques such as IEEE 802.16, and/or wireless Personal Area Network (WPAN) techniques such as IEEE 802.15, Blue-Tooth (BT), ultra wideband (UWB) and/or the like.

It is understood that the apparatus, such as the controller 20, may include circuitry for implementing audio/video and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 may be allocated between these devices according to their respective capabilities. The controller 20 thus may also include the functionality to encode and interleave message and data prior to modulation and transmission. The controller 20 may additionally include an internal voice coder, and may include an internal data modem. Further, the controller 20 may include functionality to operate one or more software programs, which may be stored in memory. For example, the controller 20 may be capable of operating a connectivity program, such as a conventional web browser. The connectivity program may then allow the mobile terminal 10 to transmit and receive web content, such as location-based content and/or other web page content, according to a Wireless Application Protocol (WAP), Hypertext Transfer Protocol (HTTP) and/or the like, for example.

The mobile terminal 10 may also comprise a user interface that may include an output device such as an earphone or speaker 24, a microphone 26, a display 28, and/or a user input interface, all of which may be operationally coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include numeric (0-9) and related keys (#, *), and/or other hard and soft keys used for operating the mobile terminal 10. Alternatively, the keypad 30 may include a QWERTY keypad arrangement. The keypad 30 may also include various soft keys with associated functions. In addition, or alternatively, the mobile terminal 10 may include an interface device such as a joystick or other user input interface. The mobile terminal 10 may further include a battery 34, such as a vibrating battery pack, for powering various circuits that are required to operate the mobile terminal 10, as well as, optionally providing mechanical vibration as a detectable output.

The mobile terminal 10 may further include a user identity module (UIM) 38. The UIM 38 may be a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 may store information elements related to a mobile subscriber. In addition to the UIM 38, the mobile terminal 10 may be equipped with memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40, non-volatile memory 42 may include a cache area for temporary storage of data. The memories can store any of a number of pieces of information, and data, used by the mobile terminal 10 to implement the functions of the mobile terminal 10. For example, the memories may include an identifier, such as an international mobile equipment identification (IMEI) code, capable of uniquely identifying the mobile terminal 10. Furthermore, the memories may store instructions for determining cell id information. Specifically, the memories may store an application program for execution by the controller 20, which may determine an identity of the current cell, e.g., cell id identity or cell id information, with which the mobile terminal 10 is in communication.

Figure 2:
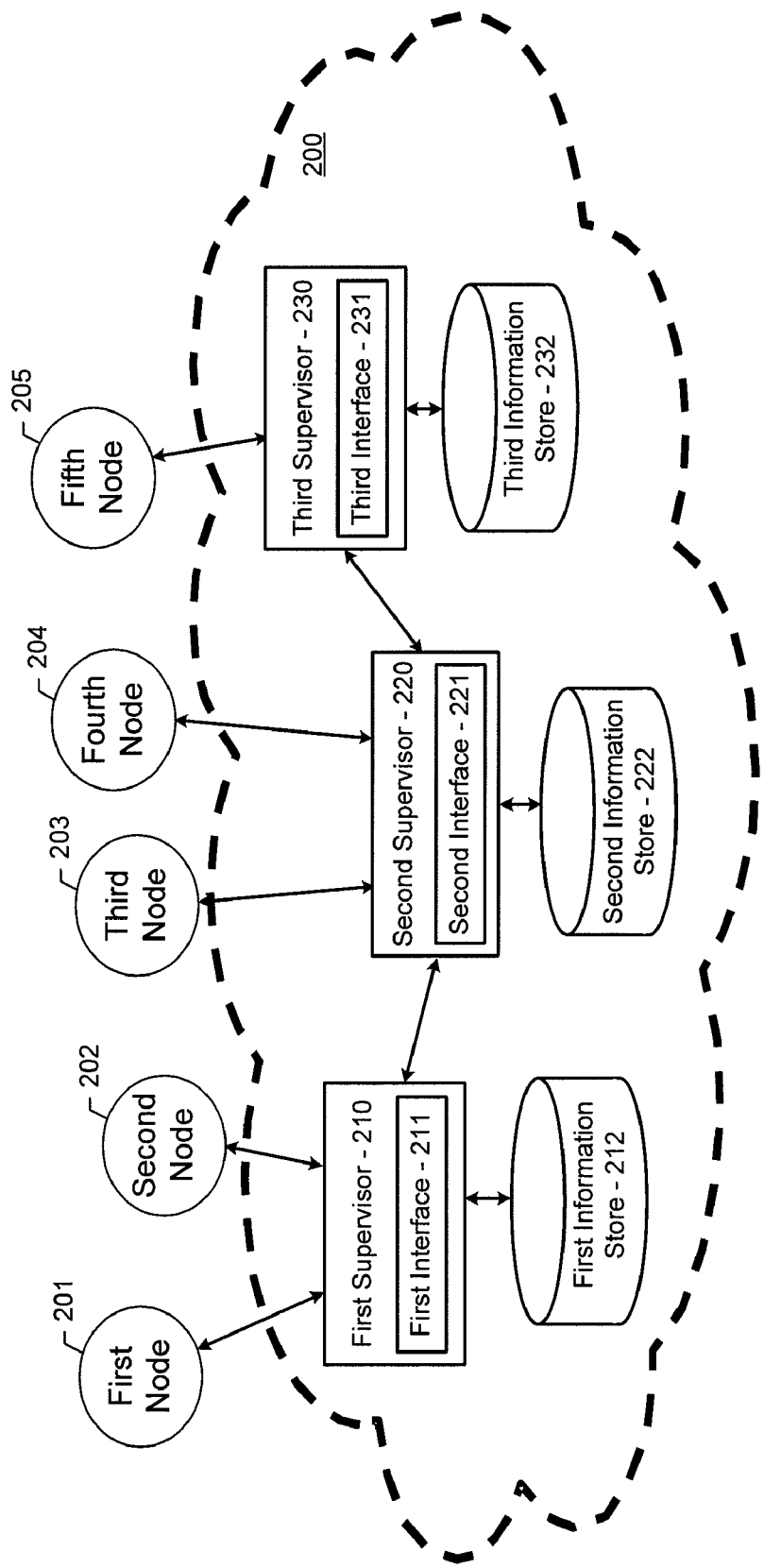
FIG. 2 illustrates a system of network entities according to some exemplary embodiments of the invention.

FIG. 2 depicts an exemplary dynamic architecture, distributed network (e.g., a smart space 200) according to various exemplary embodiments. In this example, the smart space 200 may be comprised of supervisors 210, 220, 230, interfaces 211, 221, 231, and information stores 212, 222, 232. The smart space 200 may interact with various nodes such as nodes 201, 202, 203, 204, 205.

Any device connected to a smart space may implement an information store such as the information stores 212, 222, 232. In this regard, the devices implementing an information store may be capable of storing, retrieving, computing, transmitting, and receiving information. Accordingly, in some embodiments, an information store may be a logical entity describing a location where information may be stored. According to various embodiments, an information store may span a plurality of devices. The information stores may store information associated with the smart space, and any other information the nodes (e.g., nodes 201, 202, etc.) may desire to store within the smart space. This can include, for example, information of the nodes current state or activity, information regarding activities outside of the smart space (e.g., information regarding communications with entities outside the smart space), maintenance information, or the like.

With regard to smart spaces generally, there may be a fixed number of information stores. The exemplary embodiment depicted in FIG. 2 includes three information stores. Each information store may have a connection to another entity within the smart space. The connection between an information store and another entity in the smart space may be described in terms of a cost function. As such, for example, a cost may be determined for the connection between the node 205 and the information store 212.

The nodes of the smart space 200 may provide the basis for various functionalities within the smart space. In this regard, a node may be any application or portion of an application executed by a device connected to the smart space 200. The device may be any device for storing, retrieving, computing, transmitting, and receiving information. In some embodiments, the nodes 201, 202, 203, 204, 205, may be applications executed by mobile terminals, such as the mobile terminal 10 of FIG. 1. In various embodiments, the nodes 201, 202, 203, 204, 205 may be representative of applications being executed by various devices, such that in some exemplary embodiments, node 201 and node 202 may be executed by the same device. Further, in some embodiments, a single node (e.g., the first node 201) may be implemented by more than one device such that the devices share the node. In various embodiments, a node, or the device executing the node, may be associated with a user, and the user may be the operator of the node.

A node may include an external interface, a node information store interface, and a task. The external interface may consider a node's interaction with the external world (e.g., a user). The node information store interface may be used to transfer information to and retrieve information from an information store (e.g., information stores 212, 222, 232). The task may define a relationship between the external interface and the node information store interface. For example, if a user wishes to retrieve some information from an information store to a node, a task for the retrieval (e.g., a query) may be generated. A node may interact with an information store in various manners. In this regard, a node may insert information, remove information, query information, subscribe to an information store by means of the persistent query (e.g., a subscription), and cancel such subscriptions. The various types of interactions between the nodes and the information stores may be collectively referred to as requests.

A supervisor (e.g., supervisors 210, 220, 230) may be associated with an information store. In some embodiments, a supervisor may be a software application executed by a device with an associated information store or the supervisor may be implemented on any additional device capable of storing, retrieving, computing, transmitting, and receiving information. In some embodiments, a supervisor and an information store may be comprised in the same device, such as, for example, a mobile terminal where the controller 20 includes the supervisor, and the volatile memory 40 and/or the non-volatile memory 42 includes the information store. The supervisor may include an interface (e.g., interfaces 211, 221, 231) that may facilitate interaction between the various nodes and the associated information stores. The supervisor may monitor the frequencies and types of interactions (e.g., inserts, removals, queries, subscriptions, cancellations of subscriptions, etc.) between the various nodes and the associated information store. In this regard, according to various exemplary embodiments, one or more supervisors may analyze the frequencies and types of interactions between the nodes and the information stores to determine a distribution for requests based on the connection costs. An exemplary distribution may indicate, for example, where requests may be satisfied based on the connection costs between the associated nodes and information stores.

Based on the foregoing, exemplary embodiments may determine a path for future interactions between a source (e.g., a node) and a target (e.g., an information store). The path may be a prediction of a series of connections that may be used for network interactions between a source and a target. In some exemplary embodiments, the path may be based on costs associated with each of the connections. The path may be determined based on the architecture of the network (e.g., smart space) and various data properties (e.g., meta-data associated with target information). In some exemplary embodiments, the determination of a path may constitute a hint regarding the least costly connection, or series of connections, to be used for interactions between a source and a target.

Additionally, information concentration may also be considered in determining a path. In this regard, if information in two separate locations is often interacted with as part of a common or related request, the information in the two separate locations may be more closely concentrated so as to reduce connection costs with respect to the information. The information concentration (e.g., the locality) may also consider where portions of information locality diverge (e.g., the distribution of the information within the network) based on query satisfaction and information allocation.

In this regard, in some embodiments, the determination of paths for interaction between various entities within the distributed network may also result in a determination that some interfaces (e.g., interfaces 211, 221, 231) with supervisors (e.g., supervisors 210, 220, 230) and related information stores (e.g., information stores 212, 222, 232) may be identified as information gateways. An information gateway may be an entry point and a disseminator of all information and subscriptions or other requests on the network (e.g., smart space 200). Thus, any additional subscriptions may access information through the information gateways. In some exemplary embodiments, subscriptions may access information by means of acyclic graph management, where the information gateway may constitute the root structure of the graph.

Figure 3:
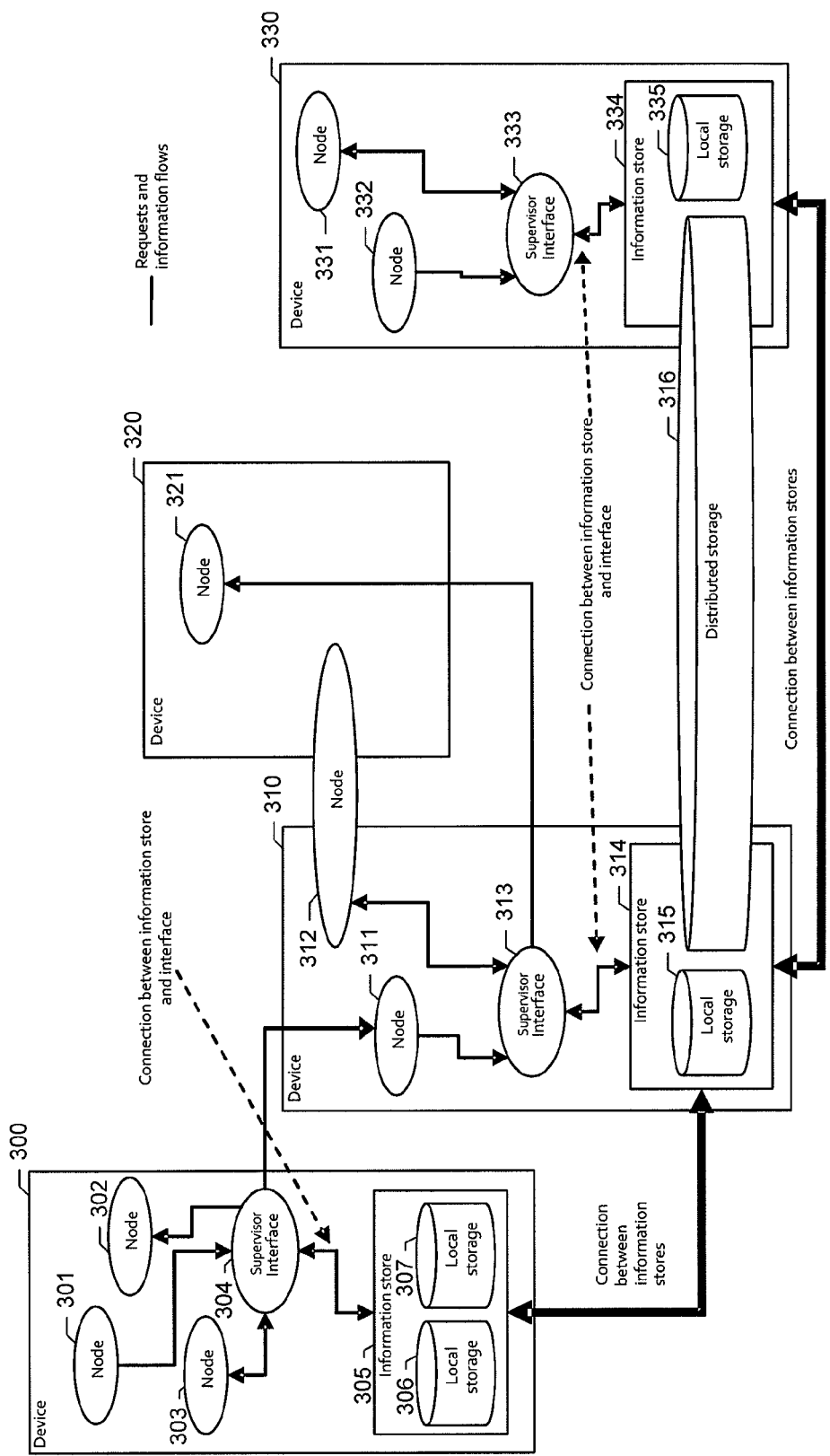
FIG. 3 illustrates another system of network entities according to some exemplary embodiments of the invention.

FIG. 3 illustrates another system of network entities according to some exemplary embodiments as described above. The system of FIG. 3 may also be included in a smart space similar to the smart space 200. The system of FIG. 3 includes four devices, device 300, device 310, device 320, and device 330. Each device may implement one or more nodes. In the exemplary system of FIG. 3, device 300 may implement node 301, node 302, and node 303. Device 320 may implement node 311 and node 312. Node 312 may be a shared node, which may be a node implemented by two or more devices. In the exemplary system of FIG. 3, node 312 is also implemented by device 320. In addition to implementing the shared node 312, device 320 may also implement node 321. Further, device 330 may also implement node 331 and node 332.

The various devices of the system of FIG. 3 may also implement supervisor interfaces. In this regard, device 300 may implement supervisor interface 304. Device 310 may implement supervisor interface 313, and device 330 may implement supervisor interface 333. Supervisor interface 313 may be a shared supervisor interface and as such, device 320 may also utilize supervisor interface 313.

The devices of the system of FIG. 3 may also implement information stores. In this regard, device 300 may implement information store 305, which may include local storage 306 and local storage 307. Device 310 may implement information store 314, which may include local storage 315 and distributed storage 316. Distributed storage 316 may be shared with device 330, which may also implement distributed storage 316. Additionally, device 330 may implement information store 334, which may include distributed storage 316 and local storage 315.

As a form of distributed information management the determination of a path may be considered within a three tier architecture incremental low-level routing mechanism, a distributed query planner, and a distributed directory management mechanism. In some exemplary embodiments, the three tier architecture may be based on the nodes, as a first tier, the supervisors and supervisor interfaces as a second tier, and the information stores as a third tier. Further, any layer above distributed directory management may be defined to serve as a distributed information location and retrieval mechanism. A purpose for implementing an architecture in this manner may be to guarantee sustained information evolution management, serialization, and access control.

According to various exemplary embodiments, the incremental low-level routing mechanism may provide routing and message passing facilities between network mapping facilities and connection selection/transfer. Below the incremental low-level routing layer a corresponding connectivity may be provided. The connectivity may be provided by means of any network specific information delivered by the connectivity layer by means of intelligent workload control with service information, which may include connection specific details. In this regard, the granularity level of information may be adjustable.

In this regard, intelligent workload control can be based on external services specifications which may be performance requirements and utilization (e.g., an access pattern). A role of intelligent workload control may be to implement an infrastructure resource provisioning subsystem that may be based on workload-resource mapping and distribution-admission control. Workload resource mapping and distribution-admission control may receive information regarding actual network topology, service availability, network conditions, and traffic patterns. These elements may be converged by means of resource management and actual performance measurements, and an intelligent workload model may be developed for use in workload planning and prediction.

In this regard, some exemplary embodiments may utilize a decision update mechanism to update a path. The decision update mechanism may utilize information gathered from two sources and fuse the information to generate a conditional rule (e.g., a path update). The two sources may be an information domain (e.g., a data specific domain) that provides meta-data, including actual content and query related content, and a network domain (e.g., a network specific domain) that provides information gathered regarding the network and the connectivity of the network from a network domain. Data specific information may be delivered by a distributed object file system infrastructure and may include meta-data object distribution and hierarchy. Network specific information may be delivered by a connectivity layer and may include actual network topology, network conditions, and traffic pattern information. As such, determining a path may converge to a request update rule which is based on the two domains' information analysis (e.g., network domain analysis and information domain analysis) and fusion of information from these domains. In some exemplary embodiments, the information gathered with respect to the different domains (e.g., network and information) may be decomposed and a fusion of the information may be implemented based on a parameters' covariance analysis.

Information that may be relevant to a network specific domain analysis may include, for example, interface properties, adjacent nodes properties, last action types, timestamps of the last actions, node access information, and the like. This and other information may be provided by a connectivity controller. The connectivity controller may reside on each device within the network, or the connectivity controller may reside on a single device that may be accessed by other network entities. Further, in some exemplary embodiments, the connectivity controller may be a software application executed by the aforementioned devices.

In this regard, the connectivity controller may be aware of its surrounding environment and network topology in addition to its local connectivity capabilities. The connectivity controller may also be aware of physical limitations of the various individual devices connected to the network, or the devices within the wireless range of the connectivity controller. In this regard, the connectivity controller may determine abstract connectivity properties of the devices participating in the distribution network. Additionally, the connectivity controller may hide the complexity of multitransport control mechanisms by providing a connectivity cost function interface.

The connectivity controller may include a multiradio controller function in the time domain that may be responsible for allocating connectivity resources based on the communication medium activity, resource availability, and wireless spectrum availability, or the like. In this regard, the connectivity controller need not have a direct effect on the interface provided to the distribution framework.

Further, the connectivity controller may implement protocols and data types for creating a network topology map and connectivity technology map of the network. The network topology map and the connectivity map may enable power efficient transport selection upon data delivery. Also, connectivity map protocols may be used to share information about the physical properties of each device connected to the network such as, for example, remaining battery life, available memory resources, computational capabilities, or the like. This information may further assist the connectivity controller in determining a next node to which data should be delivered.

An advantage of implementing the connectivity controller as described may be that in the presence of multitransport devices, heterogeneous networking technologies may be used to perform one data delivery task. For example, due to the dynamic nature of ad hoc networks (e.g., smart spaces) the initial data delivery from one node to another may be done with Bluetooth, but when the receiving node moves out of the range of the Bluetooth radio, the connectivity controller may open another connection between the nodes using, for example, WLAN and continue the data delivery. The decision of such intersystem handover may be done based on the connectivity map information and physical characteristics of the participating nodes. Additionally, all the information utilized by the connectivity controller may be provided as an input to a cost function which may be used to determine data locality and availability.

In some exemplary embodiments, due to similarity with storage infrastructure, data locality analyses and data concentration analyses may be implemented. According to various exemplary embodiments, the data locality analyses and the data concentration analyses may be performed by one or more nodes. In this regard, the one or more nodes may perform the analyses using a data dispersion scheme which may be implemented through software and/or hardware. In this regard, data locality may be analyzed in terms of temporal and spatial locality. Further, data locality may indicate the actual proximity of data to the potential consumer (e.g., the node) in terms of costs. Since a cost function may depend from several parameters (e.g., power consumption, performance, reliability, etc.), proximity may be determined in terms of these parameters. In some exemplary embodiments, the resultant cost function may be non-linear. The information provided by the connectivity layer as described above (e.g., available connectivity technologies, neighbor devices, connectivity capabilities, etc.) may be an input to the cost function. Also, device characteristics and capabilities of the devices connected to the network, such as, remaining battery life, free memory resources, and the like, may be considered as an input to the cost function when determining the data locality and a path to desired information.

Additionally, data concentration may indicate the number of available data pieces per a certain locality (e.g., within a certain proximity). As such, data concentration may serve as an input parameter of a local intelligent workload model, and may be derived from a content dispersing estimation and data tracker.

Further, based on parameters, such as reliability (e.g., data loss, consistency), performance (e.g., latency, throughput), and power consumption, an optimal operational mode may be determined with respect to a preferred strategy for the operation of the overall system. Considering these and other parameters, cumulative cost functions may be developed describing the information allocation. Further, considering the parameters of power consumption, performance, and reliability, an operational strategy can be developed. The Supervisor can utilize the operational strategy, with the cost functions, to develop an optimal operation mode with respect to that strategy. In this regard, the operational mode may assist in determining, for example, whether information should be replicated to several places for efficient query intersection, or whether a query should be passed to another network entity (e.g., a more proximate entity).

With regard to the parameters that may be considered in determining an operational mode, power consumption may be considered. In this regard, various devices connected to the network may have different power budgets and power constraints (e.g., battery powered, externally powered, etc.). The power consumption associated with the connection maintenance and data transfer between the devices may vary and, as such, may be considered in calculating the overall cost.

Additionally, performance may be considered as a parameter in determining an operational mode. In this regard, a future latency requirement for a particular information access may be estimated by monitoring the local and remote workloads and/or workload models that may be determined by each device. The information subscribers (e.g., the nodes) may embed some meta-data for the additional latency requirements in a request.

Further, reliability may be considered in an operational mode determination. In this regard, due to the dynamic nature of some networks, particular information access may not be granted at all times, for example, because the information store holding the information may no longer be present in the network. This concept may compromise the reliability and availability of the data. To counter this, the redundancy of the information and/or queries may be increased. For example, the information can be replicated to several places or, by any other means, information can be dispersed to minimize the loss if one or more information sources become unavailable.

Based on these, and possibly other, parameters an operational strategy, and an associated operational mode, for the network may be selected. For example, a desired strategy may aim to minimize power consumption while meeting the latency and reliability constraints. Latency minimization and reliability maximization strategies may be constructed in a similar way. Further, by introducing weighting factors to the parameters, multiple dimensions may be optimized simultaneously.

Operational strategies may also consider storage space constraints as a limitation with respect to any device on the system. According to various aspects of some exemplary embodiments that may utilize redundancy after stored information is dispersed, a relationship between storage space and power consumption, performance, and reliability may result. In this regard, the process of information dispersion may consume additional storage space, which may result in additional power consumption and changes in reliability and performance. If dispersed information is replicated, the dispersed blocks of information may utilize additional storage space resulting in the further consumption of available storage space. In this regard, in some instances, any increase of redundancy, in terms of dispersion, replication, or combinations thereof, may lead to the changes in terms of power, data reliability and performance. Similarly, a desired strategy and the resultant operational mode may also affect path determinations as described above, since information may be dispersed or replicated based on the operational mode. Thus, power hungry and/or explicitly expensive channels may be avoided if a delay to delivery of desired information would be unacceptable with respect to a predetermined threshold.

In this regard, a proposed path to the target information, the allocation of the requests, and the information fusion scheme may be characterized by a combination of the two domains' (e.g., network and information) information covariances. In some exemplary embodiments, a convex covariance combination of the two domains' information covariances may be utilized. Further, in some exemplary embodiments, a convex covariance combination of the statistical means and covariances in the information space (e.g., the two domains' space) may be utilized. In this regard, cross-domain and communicative uncertainties may be filtered out.

As a result, the following exemplary allocation and retrieval mechanism may be constructed within, for example, a supervisor, utilizing data-network specific information analysis and fusion, for application in networks such as smart spaces. The mechanism may consider group-based aspects (e.g., physical device action, data reliability, power consumption, performance, timing, etc.), subject-based aspects (e.g., smart space node action, etc.), and content-based aspects (e.g., codewords, data blocks, actions, etc.).

Figure 4:
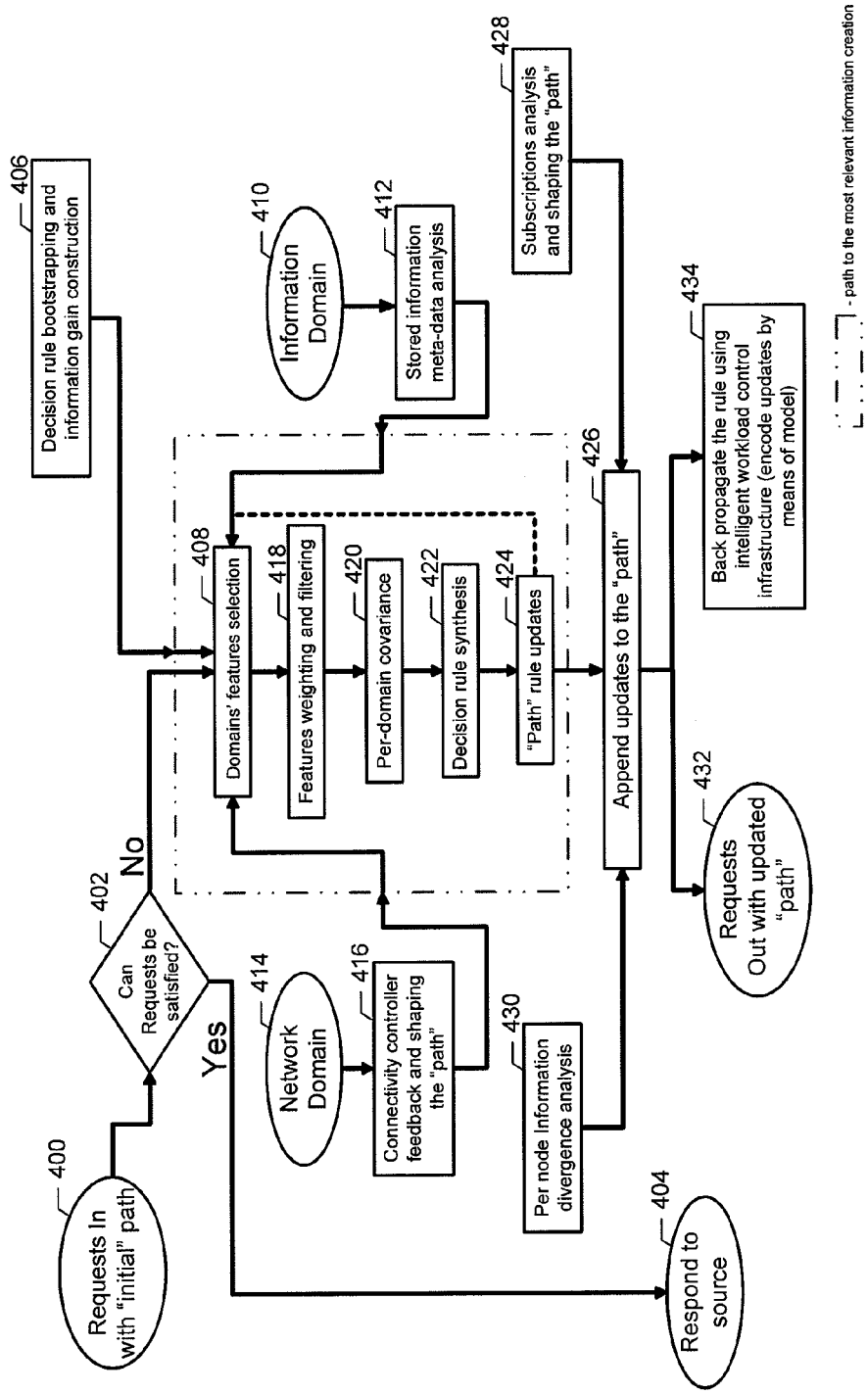
FIG. 4 illustrates a flow chart of an exemplary method according to various exemplary embodiments of the invention.

Referring now to FIG. 4, a method for determining a path update is provided. According to various embodiments, the method of FIG. 4 may be implemented by an apparatus including a processor configured to implement the method, such as, the mobile terminal 10 of FIG. 1 or the apparatus 500 of FIG. 5. At 400, requests (e.g., queries) may be received with an initial path. In this regard, the request may include data that indicates the initial path. In some embodiments, the initial path may be determined based on a previous path update or based directly on a connectivity map. In this regard, the initial path may be subject to further optimization. At 402, a determination may be made regarding whether the request can be satisfied. In this regard, the information store, or supervisor associated with an information store, may analyze the request and determine if the request may be satisfied locally. If the request can be satisfied, then a response may be provided to the source (e.g., a node) at 404.

If the request cannot be satisfied a path update may be determined to intelligently route the request. In this regard, a domains' features selection may be implemented at 408. The domains' features selection may be based upon a decision rule bootstrapping and information gain construction at 406.

In some exemplary embodiments each network device may then provide for feature selection from the network and information domains. The fusion and update scheme may be subsequently constructed. The connectivity related information gain may be obtained from the connectivity controller, as described above. In particular, in some exemplary embodiments, the information domain feature selection may include filtering meta-data and actual content and the decomposition of these for subsequent fusion. Similarly, the network domain feature selection may include filtering and decomposition of the network or connectivity information for subsequent fusion. The process of feature selection may utilize any existing filtering technique, such as, for example, particle filtering. In particular, information gain may be obtained by aggregation of meta-data from low-level data allocation analysis. For example, meta-data, such as, "inode," may be utilized as provided by storage file systems, bindings between high abstract information, and content from the information stores.

In this regard, features may be selected from an information domain 410. In this regard, a stored information meta-data analysis may be performed at 412 and provided for feature selection. Additionally, features may be selected from a network domain 414. In this regard, a connectivity controller may provide feedback and shaping of the initial path at 416 and provide the result for feature selection.

According to various exemplary embodiments, the information gain of the data related to each domain may be constructed using the following assumptions. Considering a set of aggregate queries $Q=\{q_1, \ldots, q_m\}$ over a set of k distinct data sources, a set of data source readings may be a vector $x = (x_1, \ldots, x_k) \in \mathfrak{R}^k$. A request may request an aggregate value of some subset of the data sources at some desired frequency. This may allow each request to be expressed as a k-bit vector, where element j of the vector is 1 if $x_j$ contributes to the value of $q_j$, and otherwise element j may be 0. The value of request $q_j$ on data source readings x may be expressed as the dot product $q_j \cdot x$.

Upon selecting the features, each feature may be weighted and filtered at 418. At 420, a per-domain covariance may be calculated. In this regard, a covariance may be calculated with respect to the information from each domain. The result of these calculations may be synthesized as a decision rule at 422. Synthesizing (or fusing) the per-domain covariances may be implemented by performing a convex covariance combination of the two domain covariances. Accordingly, a path rule update may be performed at 424.

In this regard, once the features are extracted and the information gains are constructed, the actual fusion process may begin. Since fusion of the convex combination of two domain covariances may be used, the process may include the following. Starting from two given estimates $\hat{x}_1$ and $\hat{x}_2$ of the true state x with corresponding positive definite error variance matrices $P_1$ and $P_2$, a combined estimate $\hat{x}$ with error variance matrix P may be sought. The overall estimate may be given by a basic convex combination of the two estimates, and the algorithm may be $$P_{xx}^{-1} = \omega P_{x_1 x_1}^{-1} + (1-\omega) P_{x_2 x_2}^{-1}$$
$$P_{xx}^{-1} \hat{x} = \omega P_{x_1 x_1}^{-1} \hat{x}_1 + (1-\omega) P_{x_2 x_2}^{-1} \hat{x}_2$$

where $\omega \in [0, 1]$. The free parameter $\omega$ may manipulate the weights which are assigned to $x_1$ and $x_2$. Different choices can be used to optimize the path update with respect to different performance criteria. Cost functions which are convex with respect to ω may have only one distinct optimum in the range. Accordingly, in some exemplary embodiments, any optimization strategy can be used, ranging from Newton-Raphson to sophisticated semi-definite or dynamic programming techniques which can minimize any norm. In some exemplary embodiments, further optimization of the path rule update may be performed by performing additional domains' features selection at 408 and repeating the procedure.

At 426, the path rule updates may be appended to the request to generate an updated path. In this regard, a per node information divergence analysis may be performed at 430, and a subscriptions analysis and shaping of the path may be performed at 428. As such, appending path updates to the request may be based on the per node information divergence analysis and the subscriptions analysis and shaping of the path. Further, the updates may be encoded variation of an action model. The path rule updates may be appended by performing a per node information divergence analysis, since a node as an information creator may be storing that information and accessing it. As such, the node may provide explicit information management, and perform a subscriptions analysis. Accordingly, the analysis may provide implicit information management due to the persistent nature of subscriptions.

As a result, the request may be provided with an updated path at 432. The determined rule may also be back propagated using a workload control infrastructure at 434. In this regard, the updates may be encoded by means of an intelligent workload model or a means to append to or update the existing intelligent workload control model.

The resultant estimation may be used to update an initial set of aggregate requests and to embed the necessary changes to the initially received requests. This approach may also be extended to information concentration management. The updated estimate may be used to track the allocation for the desired information distributed in the network and associate the information to the set of aggregate requests that are targeted for that information. Thus, a dual side optimization is possible, from the request and from the information location, concurrently.

According to various exemplary embodiments, an approach is provided as a connection between workload management and request distribution. Since access analysis behavior may be different from request distribution and triggering, some assistant analysis may be defined. Request analysis may include inserts or query issuance (e.g., query information), responding to a query, matching the result against the original query, and actual access to the information and referred content. In some embodiments, when the result does not match, the query may be forwarded to the next best information store candidate. Further, if the result does match the query, accompanying information re-distribution action may be taken.

Further, workload management may be able to create intelligent workload models generated by actual accesses. Other steps in this regard may be considered separately. As described above, various exemplary embodiments, of the present invention may treat any node's activities as an abstract information gain vector. As a result, query distribution and subscription allocation based on determined paths may be optimized and updated using the actual network connectivity and information specific domain status.

The flowchart of FIG. 4. depicts a system, method, and program product according to some exemplary embodiments of the invention. It will be understood that each block, step, or operation of the flowchart, and combinations of blocks, steps or operations in the flowchart, can be implemented by various means, such as hardware, firmware, and/or software including one or more computer program code portions, program instructions, or executable program code portions. For example, one or more of the procedures described above may be embodied by computer program code instructions. In this regard, the computer program instructions which embody the procedures described above may be stored by a memory device of the apparatus and executed by a processor in the apparatus. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s), step(s), or operation(s). These computer program instructions may also be stored in a computer-readable memory that can direct a computer, a processor, or other programmable apparatus to function in a particular manner, such that the instructions stored in the computer-readable memory produce an article of manufacture including instruction means which implement the function specified in the flowchart block(s), step(s), or operation(s). The computer program instructions may also be loaded onto a computer, processor, or other programmable apparatus to cause a series of operational steps to be performed on the computer, processor, or other programmable apparatus to produce a computer-implemented process such that the instructions which execute on the computer, processor, or other programmable apparatus provide steps for implementing the functions specified in the flowchart block(s), step(s), or operation(s).

Accordingly, blocks, steps, or operations of the flowchart support combinations of means for performing the specified functions, combinations of steps for performing the specified functions and program instruction means for performing the specified functions. It will also be understood that one or more blocks, steps, or operations of the flowchart, and combinations of blocks, steps, or operations in the flowchart, can be implemented by special purpose hardware-based computer systems which perform the specified functions or steps, or combinations of special purpose hardware and computer instructions.

Figure 5:
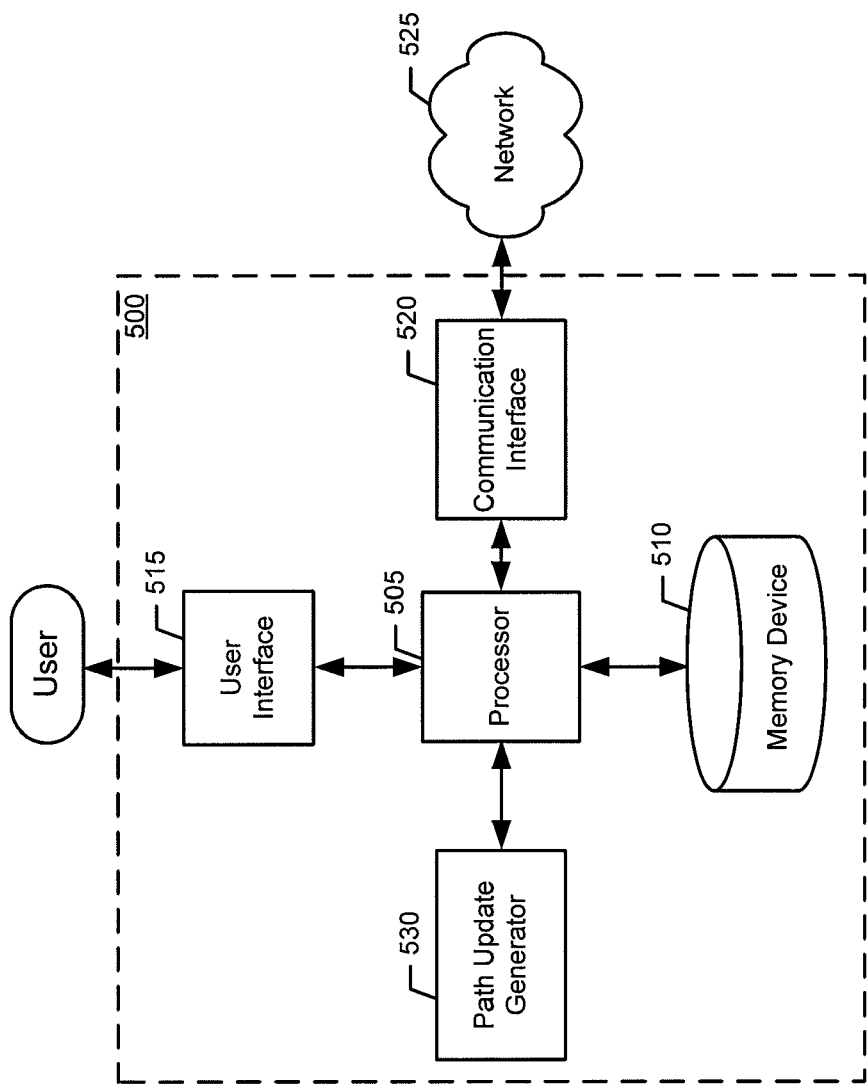
FIG. 5 illustrates an apparatus connected to a network according to some exemplary embodiments of the invention.

Referring now to FIG. 5, an exemplary apparatus 500 for distributed information management is described. Apparatus 500 may be embodied as a server or other network device including, for example, a mobile terminal, such as mobile terminal 10 of FIG. 1, an information store, a supervisor, or the like. The apparatus 500 may include or otherwise be in communication with a processor 505, a user interface 515, a communication interface 520, and a memory device 510. The memory device 510 may include, for example, volatile and/or non-volatile memory (e.g., volatile memory 40 and/or non-volatile memory 42). The memory device 510 may be configured to store information, data, applications, instructions, or the like for enabling the apparatus to carry out various functions in accordance with exemplary embodiments. For example, the memory device 510 could be configured to buffer input data for processing by the processor 505. Additionally or alternatively, the memory device 510 could be configured to store instructions for execution by the processor 505. As yet another alternative, the memory device 510 may be one of a plurality of databases that store information in the form of static and/or dynamic information, for example, in association with requests, network domain information, information domain information, or the like.

The processor 505 may be embodied in a number of different ways. For example, the processor 505 may be embodied as a microprocessor, a coprocessor, a controller (e.g., controller 20 from FIG. 1), or various other processing means or elements including integrated circuits such as, for example, an ASIC (application specific integrated circuit) or FPGA (field programmable gate array). In an exemplary embodiment, the processor 505 may be configured to execute instructions stored in the memory device 510 or otherwise accessible to the processor 505.

The user interface 515 may be in communication with the processor 505 to receive an indication of a user input at the user interface 515 and/or to provide an audible, visual, mechanical, or other output to the user. As such, the user interface 515 may include, for example, a keyboard, a mouse, a joystick, a display, including, for example, a touch screen display, a microphone, a speaker, or other input/output mechanisms. In an exemplary embodiment in which the apparatus 500 is embodied as a server, the user interface 515 may be limited, or even eliminated.

The communication interface 520 may be embodied as any device or means embodied in either hardware, software, or a combination of hardware and software that is configured to receive and/or transmit data from/to a network and/or any other device or module in communication with the apparatus 500. In this regard, the communication interface 520 may include, for example, an antenna, a transmitter, a receiver, a transceiver and/or supporting hardware or software for enabling communications with network 525, which may be any type of wired or wireless network. While network 525 may utilize a tiered structure, a peer-to-peer structure may also be implemented. Further, network 525 may include a dynamic structure, such as a smart space. Via the communication interface 520 and the network 525, the apparatus 500 may communicate with various entities that may be connected to the network 525.

The path update generator 530 of apparatus 500 may be any means or device embodied in hardware, software, or a combination of hardware and software that is configured to carry out the functions of the path update generator 530 as described herein. In an exemplary embodiment, the processor 505 may include, or otherwise control the path update generator 530. In various exemplary embodiments, the path update generator 530 or portions of the path update generator 530 may reside on an entity remote from apparatus 500 such as a server, or other network device including a mobile terminal, such as mobile terminal 10 of FIG. 1.

According to various exemplary embodiments, the path update generator 530 may be configured to select one or more network domain features and one or more information domain features. In this regard, the apparatus 500 may include various means for selecting features, which may include the processor 505, the path update generator 530, algorithms for selecting features described herein and executed by the foregoing or other elements, and/or the like. The network domain features may be selected based on the connectivity of a network, such as network 525. In some embodiments, a connectivity controller may provide the connectivity of the network. The information domain features may be selected based on meta-data associated with information stored within the network. In some exemplary embodiments, the meta-data may be associated with the information targeting in a request or query. In some exemplary embodiments, data specific features may be extracted from a distributed file system infrastructure. The specific features may consist of meta-data, data distribution and hierarchy. Accordingly, data specific feature selection may consist of meta- and raw data filtering and decomposition for the further fusion. In particular, information gain may be obtained by aggregation of meta-data from low-level data allocation analysis, metadata like "inode" straight through the meta-data provided by storage file systems, bindings between high abstract information and content within the information stores.

According to some exemplary embodiments, the path update generator 530 may also be configured to weight and filter the one or more network domain features and the one or more information domain features. The selected features may be weighted and filtered based on a combination of power consumption, latency and reliability constraints.

The path update generator 530 may also be configured to determine a network domain covariance based on the one or more network domain features. In this regard, the apparatus 500 may include various means for determining the network domain covariance, which may include the processor 505, the path update generator 530, algorithms for determining the network domain covariance described herein and executed by the foregoing or other elements, and/or the like. The path update generator 530 may be further configured to determine an information domain covariance based on the one or more information domain features. In this regard, the apparatus 500 may include various means for determining the information domain covariance, which may include the processor 505, the path update generator 530, algorithms for determining the information domain covariance described herein and executed by the foregoing or other elements, and/or the like. For example, if the number of accesses to the particular information is taken and used for covariance analysis, then a plurality of requests per some predefined period of time may be converted into a moving average as $\hat{x}_1$ of the true state x and the covariance may be calculated as $P_{x_1} = E[x_1(t)x_1(t+\tau)]$.

The path update generator 530 may be further configured to combine the network domain covariance and the information domain covariance to determine a path update. In this regard, the apparatus 500 may include various means for combining the network domain covariance and the information domain covariance, which may include the processor 505, the path update generator 530, algorithms for combining the network domain covariance and the information domain covariance described herein and executed by the foregoing or other elements, and/or the like. In some embodiments, combining the network domain covariance and the information domain covariance may include fusing the network domain covariance and the information domain covariance via a convex covariance combination.

Additionally, in some exemplary embodiments, the path update generator 530 may also be configured to append the path update to a request by means of embedded information. Further, the path update generator may be configured to receive a request including an initial path. In this regard, the path update may be appended such that the initial path is updated with the path update. Further, in some additional exemplary embodiments, the path update generator 530 may be configured to append the path update by performing a per node information divergence analysis, since a node as an information creator may be storing that information and accessing it, thus providing explicit information management, and performing a subscriptions analysis thus provides implicit information management due to the persistent nature of subscriptions.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    selecting one or more network domain features and one or more information domain features, the network domain features including information describing a network topology of a dynamic architecture distributed network, and the information domain features being based on meta-data describing queries and requested content within the network;
    determining a network domain covariance based on the one or more network domain features;
    determining an information domain covariance based on the one or more information domain features;
    weighting and filtering the one or more network domain features and the one or more information domain features; and
    combining the network domain covariance and the information domain covariance to determine a path update, said combining the network domain covariance and the information domain covariance includes fusing the network domain covariance and the information domain covariance via a convex covariance combination, wherein the combining is performed by a processor configured to perform the combining.

2. The method of claim 1 further comprising appending the path update to a request.

3. The method of claim 2 further comprising receiving the request including an initial path, and wherein appending the path update to the request includes appending the path update such that the initial path is updated with the path update.

4. The method of claim 2, wherein appending the path update includes performing a per node information divergence analysis and performing a subscriptions analysis.

5. An apparatus comprising at least one processor and at least one memory including computer program code, the at least one memory and the computer program code, with the at least one processor, directs the apparatus at least to:
    select one or more network domain features and one or more information domain features, the network domain features including information describing a network topology of a dynamic architecture distributed network, and the information domain features being based on meta-data describing queries and requested content within the network;
    determine a network domain covariance based on the one or more network domain features;
    determine an information domain covariance based on the one or more information domain features;
    weigh and filter the one or more network domain features and the one or more information domain features; and
    combine the network domain covariance and the information domain covariance to determine a path update, said combine the network domain covariance and the information domain covariance includes being directed to fuse the network domain covariance and the information domain covariance via a convex covariance combination.

6. The apparatus of claim 5, wherein the apparatus is further directed to append the path update to a request.

7. The apparatus of claim 6, wherein the apparatus is further directed to receive the request including an initial path, and wherein the apparatus directed to append the path update to the request includes being directed to append the path update such that the initial path is updated with the path update.

8. The apparatus of claim 6, wherein the apparatus directed to append the path update includes being directed to perform a per node information divergence analysis and perform a subscriptions analysis.

9. A computer program product comprising at least one non-transitory computer-readable storage medium having executable computer-readable program code portions stored therein, the computer-readable program code portions comprising:
    a first program code portion to select one or more network domain features and one or more information domain features, the network domain features including information describing a network topology of a dynamic architecture distributed network, and the information domain features being based on meta-data describing queries and requested content within the network;
    a second program code portion to determine a network domain covariance based on the one or more network domain features;
    a third program code portion to determine an information domain covariance based on the one or more information domain features;
    a fourth program code portion to weigh and filter the one or more network domain features and the one or more information domain features; and
    a fifth program code portion to combine the network domain covariance and the information domain covariance to determine
    a path update, said combine the network domain covariance and the information domain covariance includes being configured to fuse the network domain covariance and the information domain covariance via a convex covariance combination.

10. The computer program product of claim 9, wherein the computer-readable program code portions further comprise a fifth program code portion configured to append the path update to a request.

11. The computer program product of claim 10, wherein the computer-readable program code portions further comprise a sixth program code portion configured to receive the request including an initial path, and wherein the fifth program code portion configured to append the path update to the request includes being configured to append the path update such that the initial path is updated with the path update.

12. The computer program product of claim 10, wherein the fifth program code portion configured to append the path update to the request includes being configured to perform a per node information divergence analysis and perform a subscriptions analysis.

13. An apparatus comprising:
    means for selecting one or more network domain features and one or more information domain features, the network domain features including information describing a network topology of a dynamic architecture distributed network, and the information domain features being based on meta-data describing queries and requested content within the network;

means for determining a network domain covariance based on the one or more network domain features;

means for determining an information domain covariance based on the one or more information domain features;

means for weighting and filtering the one or more network domain features and the one or more information domain features; and means for combining the network domain covariance and the information domain covariance to determine a path update, said combining the network domain covariance and the information domain covariance includes fusing the network domain covariance and the information domain covariance via a convex covariance combination.

14. The apparatus of claim 13 further comprising means for appending the path update to a request.

* * * * *

UNITED STATES PATENT AND TRADEMARK OFFICE
CERTIFICATE OF CORRECTION

PATENT NO. : 8,291,052 B2  
APPLICATION NO. : 12/144726  
DATED : October 16, 2012  
INVENTOR(S) : Boldyrev et al.

It is certified that error appears in the above-identified patent and that said Letters Patent is hereby corrected as shown below:

In the Specifications:

Column 1,  
Line 23, "Modem" should read --Modern--.

Column 5,  
Line 16, "UIM 3 8" should read --UIM 38--.

Column 14,  
Line 48, "device 5 10" should read --device 510--.

Signed and Sealed this  
Seventh Day of May, 2013

Teresa Stanek Rea  
*Acting Director of the United States Patent and Trademark Office*